(12) United States Patent
Reis

(10) Patent No.: US 6,415,722 B1
(45) Date of Patent: Jul. 9, 2002

(54) REMOTE-CONTROLLED VEHICLE FOR OPERATIONS INSIDE PIPELINES

(75) Inventor: Ney Robinson Salvi Dos Reis, Rio de Janeiro (BR)

(73) Assignee: Petroleo Brasileiro S.A., Petrobras (BR)

( * ) Notice: Subject to any disclaimer, the term of this patent is extended or adjusted under 35 U.S.C. 154(b) by 0 days.

(21) Appl. No.: 09/651,569

(22) Filed: Aug. 28, 2000

(30) Foreign Application Priority Data

Sep. 28, 1999 (BR) ............................................. 9904364

(51) Int. Cl.[7] ............................................. B63B 13/00
(52) U.S. Cl. ................................................. 104/138.2
(58) Field of Search ........................ 104/138.1, 138.2; 346/33 P; 378/60; 73/866.5, 865.8, 40.5 R; 33/544, 777; 324/220, 232, 242, 247

(56) References Cited

U.S. PATENT DOCUMENTS

| | | | | |
|---|---|---|---|---|
| 2,518,330 A | * | 8/1950 | Jasper et al. | 104/138.2 |
| 4,481,816 A | * | 11/1984 | Prentice | 33/544 |
| 4,522,129 A | * | 6/1985 | Jerberyd | 104/138.2 |
| 4,852,391 A | * | 8/1989 | Ruch et al. | 73/40.5 R |
| 5,537,035 A | * | 7/1996 | Fowler et al. | 324/220 |
| 5,791,255 A | * | 8/1998 | Box | 104/138.2 |
| 6,044,769 A | * | 4/2000 | Oka et al. | 104/138.2 |

\* cited by examiner

*Primary Examiner*—Mark T. Le
(74) *Attorney, Agent, or Firm*—Nixon & Vanderhye PC (57) ABSTRACT

Remote-controlled equipment (1) with the ability to move through the inside of a pipeline or other confined cylindrical volumes, pulling an umbilical (10) and carrying accessories. It consists basically of a body (2) and a through-bar (8) which are equipped with heads (3, 4, 5). Said heads are able to be fixed to the inner wall of the pipeline or released therefrom alternately by means of manual or automatic commands. The vehicle (1) has various safety devices to prevent it becoming caught inside the pipeline in abnormal situations. The invention (1) makes it possible to take tools or materials to a remote point inside the pipeline in order to carry out diverse operations.

6 Claims, 8 Drawing Sheets

REMOTE-CONTROLLED VEHICLE FOR OPERATIONS INSIDE PIPELINES

FIELD OF THE INVENTION

The invention lies in the field of robotic equipment used in the activities of producing and transporting petroleum and derivatives thereof.

More specifically, it relates to equipment intended to allow the introduction of tools or other equipment or materials inside pipelines for petroleum or derivatives, preferably when these pipelines are of great length and they present conditions where access is difficult, are installed at great depths, or are buried. Such tools may, for example, be used for the purposes of removing obstructions, inspection or the like.

Although designed for use in the petroleum industry, the invention may be applied in any other industrial areas which use pipelines or other confined spaces which may require a certain internal intervention such as, for example, water- and gas-distribution installations, power-generation plants of the hydraulic, thermal or nuclear type, refineries, various industrial-process facilities, etc.

BACKGROUND OF THE INVENTION

With the development of new technologies, offshore oil production has been becoming viable at increasingly greater depths. This situation gives rise to the need for the installation of diverse equipment and for an extensive network of pipelines at considerable depths. Aside from other technological challenges which are being overcome, in connection with increasingly stringent equipment specifications owing to the high pressures involved, previously unanticipated problems frequently arise as a consequence of low temperatures. Such problems are frequently associated with the characteristics of the fluid conveyed or of the oil produced.

Amongst problems arising from the low temperatures, a tendency has been observed for oils to become less fluid, for the formation of hydrates, the deposition of paraffin, and frequently the occurrence of severe flow restrictions or even stoppages in pipes. Obstructions, which may also be caused by the deposition of sand or other materials, frequently occur a long way from the nearest access point.

The equipment of the present invention is intended to be able to move inside pipelines, within specific diameter bands, using force components normal to the substantially cylindrical pipeline walls in order to obtain positive traction. It makes it possible to arrive at the desired point, or at the point of an obstruction, carrying selected equipment and having available the capacity to there carry out the operations required to induce a flow such as, for example, application of the method known as SGN (Nitrogen-Generating System), application of solvents, filming, inspections by means of non-destructive testing (NDT), scraping, etc., it being possible, therefore, for it to be equipped with interfaces suited to the aforesaid operations (not described in this specification).

In its simplest form, the equipment may be viewed as a dual-action hydraulic cylinder and through-bar, equipped with two trios of cams, or fins, connected to the through-bar and with one trio of fins connected to the casing, or body, of the hydraulic cylinder. The sets of fins, normal to the walls of the pipeline, function as independent anchoring systems for alternately the casing and the through-bar of the hydraulic cylinder. Therefore, the trios of fins are equipped with, for example, hydraulic actuators. When pressurized, this actuator applies a force to the fins, resulting in a force normal to the walls of the pipeline, which prevents movement of the casing or of the through-bar.

By pressurization of its respective trio of fins the body of the hydraulic cylinder is temporarily fastened to the wall of the pipeline. Under these conditions, by a rear chamber of the body of the said hydraulic cylinder being pressurized, the through-bar, whose fins yield, advances.

In a second stage, the fins of the casing are depressurized and the fins of the through-bar are pressurized. Then, a front chamber of the body of the hydraulic cylinder is pressurized. Since the bar is now fixed and the casing now has yielding fins, the casing advances.

At the end of this movement, the actuating system will have returned to the initial configuration, but the assembly as a whole will have advanced by one step and will be ready to initiate a further cycle.

Another aspect of importance in the design of the equipment according to the invention is that it makes use of a locking effect on the casing, by means of the contact of the fins with the inner wall of the pipeline. Even when the fins are yielding (actuator depressurized), this locking effect prevents the equipment from being moved backwards, for example owing to the efforts of the umbilical. Principally the architecture and spatial arrangement of the fins contribute to achieving this result of avoiding backwards movement of the vehicle.

STATE OF THE ART

Currently, for work involving the cleaning or unblocking of pipes, the petroleum industry generally uses equipment known as a pig. This is a round or oval object which is generally manufactured from some polymeric material, or compound of various materials, which "travels" along a section of pipe. During travel, it scrapes off the partially obstructing incrustations from the inner surface of the pipeline. The launcher is installed at the starting point and the so-called pig receiver is installed at the opposite end.

However, for the pig to move, requires a pressure differential between the two ends and the possibility of establishing a flow of fluid in the pipe. When the pipeline is completely obstructed such a differential is not achieved and the fluid does not circulate; hence a kind of hydraulic "wedge" is formed and consequently the pig cannot be used.

The starting point of the invention was an operational emergency. In 1997, an obstruction occurred in an eight-inch petroleum-export line from a Petrobras offshore platform. The first step in solving the problem was to locate the precise point of the obstruction. A highly sensitive tool was therefore developed, based on the increase in the diameter of the pipe when the pipe is pressurized. Using this tool, the site of the obstruction was therefore located, approximately eight kilometers from the nearest end (at the offshore production platform).

Given the nature of the incident, with total interruption of the flow, it was not possible to use pigs. It was therefore decided to use another method available for interventions in pipelines. More specifically, Petrobras chose to launch "flexitube" equipment. This is a flexible tube, with a degree of resistance, which is threaded inside the pipe.

In the case in point, because the site of the obstruction was a long way from the flexitube launch point, it was not possible for the end of the flexitube to reach the obstruction. Despite having considerable resistance, the flexitube has a finite force-application capacity when pushed inside a pipeline, before it suffers excessive flexing and deformation. Principally on account of friction it is noted that, when pushed inside a pipeline, the flexitube tends to form a helicoid bearing on the inner surface of the pipeline. Under such conditions friction increases considerably and greater force is required to push the flexitube inside the pipeline. Helicoid formation is thus accentuated and there is a consequent spring effect. As of a certain point, owing to limitations either on the part of the material from which the flexitube is made or on the part of the equipment pushing it, this effect prevents progress of its front tip, limiting the extent of the intervention. In the case in point the flexitube was successfully inserted up to a distance of approximately one and a half kilometers, which was insufficient to reach the obstruction site. It was therefore not possible, as had been hoped, to take to the blockage site the heated liquid resulting from the SGN reaction or any solvent, which was the unblocking tactic selected for this case.

This was the situation which gave rise to a device to create equipment which could assist in the introduction of the flexitube or which was capable of carrying some other tool or an umbilical as far as a specific point inside a pipeline. The invention which will be described in this specification arose from this device.

Immediately after the occurrence of the above pipeline stoppage, a literature search was made and possible manufacturers contacted, but few equipment options were found with effective ability to move inside pipelines. Only two systems addressed the problem or a similar application.

One of them is the equipment known commercially as "Well Tractor", manufactured by Welltec and designed for interventions in wells. A disadvantage of this equipment is its excessive length, which makes it unsuitable for certain types of travel.

As part of the "Deepstar" technological development programme, Radoil Tool Co., in association with Ambar Production Services, developed a type of pulling device, combined with buggies, for application with flexitubes, the aim being to facilitate its movement inside pipelines.

Neither of these alternatives cater for Petrobrás' diverse operational requirements; both alternatives need further development and proved to be unsuitable for this case.

One of the advantages of the invention now set forth is that it can be applied both with flexitubes and to pull hydraulic or conventional umbilicals. In the case of a flexitube, the invention will undoubtedly substantially increase its range, since it will be pulled constantly and thus friction will be reduced. Hydraulic or other power for the vehicle in this case would be supplied via the actual flexitube. Another major advantage of the invention is that it is a multifunction device, i.e. it can be fitted with a variety of tools to deal with a variety of obstructions such as, for example, obstructions caused by an accumulation of sand, paraffin, hydrates, etc. It is therefore able to take to the obstruction site solvent, SGN, a suction capability, etc. all via a conventional umbilical or, if necessary, by means of a special umbilical.

SUMMARY OF THE INVENTION

This relates to remote-controlled equipment with the ability to move, pulling an umbilical and carrying predominantly cylindrical accessories through the inside of a pipeline or other confined volume.

It consists basically of a body, or casing, surrounding a through-bar. The equipment has heads for individualized fixing of the casing and of the through-bar on the inner wall of the pipeline. The fixing system consists of sets of fins, with progressive adjustment, mounted on suitable structures (heads).

In order to move, the equipment has a system for controlling fixing/release of the casing and of the through-bar. Thus, the heads are capable of being fastened to the inner wall of the pipeline or released therefrom alternately by means of manual or automatic controls.

The vehicle has safety devices to prevent it becoming caught inside the pipeline in abnormal situations. In emergencies or in the event of a power-supply failure, the architecture of the assembly is immediately altered, seeking a more slender shape without points of interference.

Although hydraulic equipment is described, other forms of power may be used.

In the embodiment described, the umbilical is connected to the rear part of the casing of the vehicle. However, another connection point may be selected.

The invention makes it possible to carry tools, equipment or materials to a remote point inside the pipeline to carry out unblocking operations, inspections or other operations.

BRIEF DESCRIPTION OF THE DRAWINGS

FIG. 3 shows, in diagrammatic and simplified views and sections, an embodiment of a front or rear head.

FIG. 4 shows, in simplified form, an embodiment of a collapser structure, via an upper view and two cross sections. FIG. 4A diagrammatically shows an upper view, FIG. 4B diagrammatically shows the transverse section 4B—4B and FIG. 4C diagrammatically shows the longitudinal section 4C–4C of the collapser.

FIG. 5 shows an embodiment of a collapser fitting.

FIG. 7 shows an embodiment of a fin-actuator hydraulic cylinder.

FIG. 8 shows views of an embodiment of a fin and related parts.

DETAILED DESCRIPTION OF THE INVENTION

For a better understanding of the invention, it will be described with reference to the Figures which accompany this specification. It should be pointed out, however, that the Figures illustrate only one preferred embodiment of the invention and therefore have no limiting character. In compliance with the inventive concept, to be described below, it will be clear to the expert in this field that it is possible to vary the number of heads and the number of fins of the head, and the arrangement of said fins, in order to modify the format of parts, to vary types of interconnection and to include complementary devices, all these possibilities are within the scope of the invention. A description will be given only of principal parts; assemblies, details such as seals, pins, connections, plugs, sleeves, pipes, orifices, etc. are omitted.

The invention is illustrated by FIGS. 1 to 8 inclusive.

Figure 1:
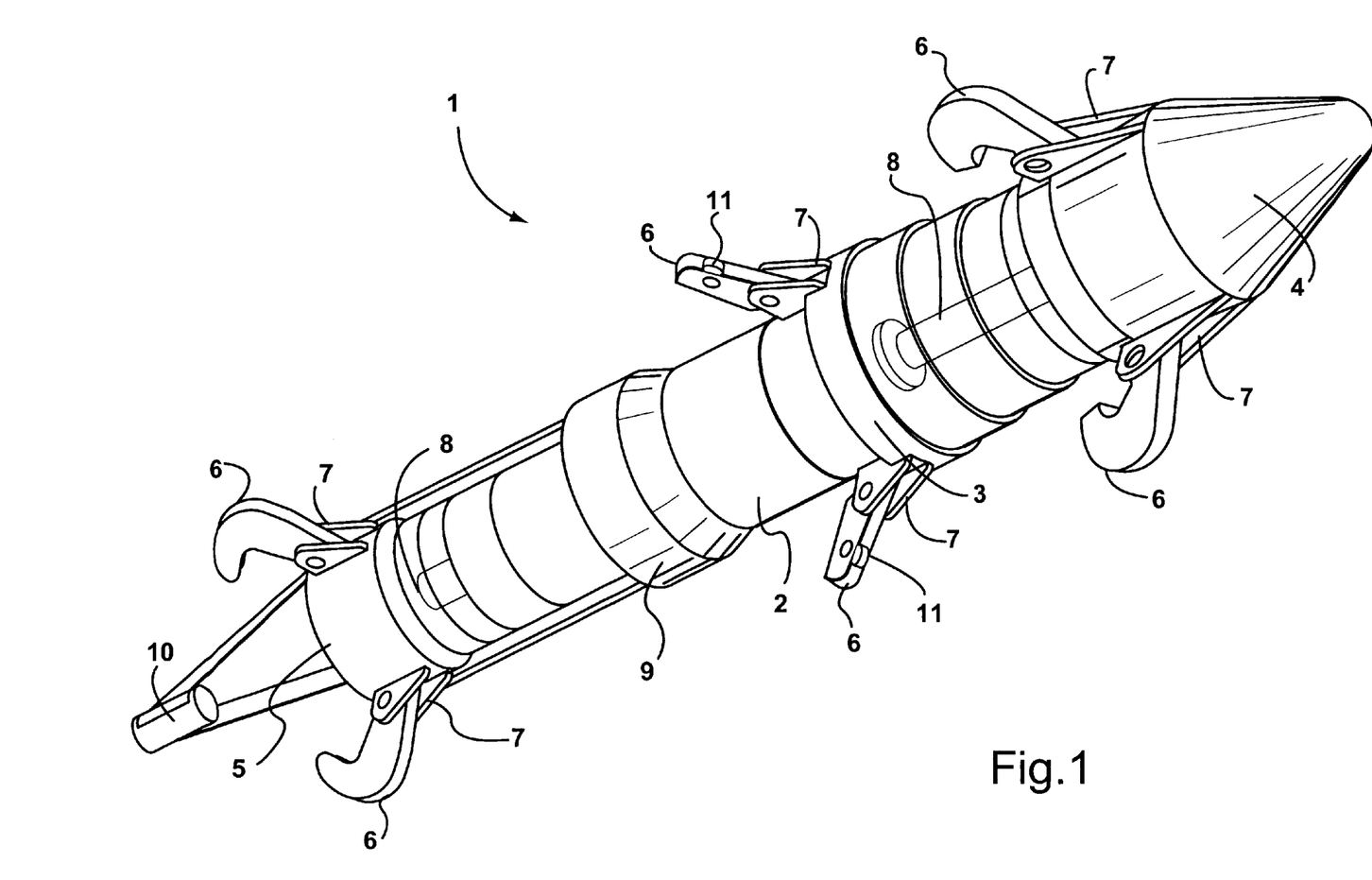
FIG. 1 shows a three-dimensional view of one embodiment of the invention, in which the principal parts of the equipment may be seen.

FIG. 1 shows a three-dimensional, diagrammatic and simplified view of an embodiment of the invention. The remote-controlled vehicle (1) has a predominantly cylindrical, elongate shape and consists basically of a body or casing (2), inside which a longitudinally movable through-bar (8) operates, actuated hydraulically for example. The body (2) and the through-bar (8) may be formed by means of adaptations in a conventional hydraulic cylinder, for example. The through-bar (8) is provided with the necessary orifices for the circulation of hydraulic fluid. The distribution of fluid to the various parts of the equipment is achieved by means of orifices machined in the mechanical elements and, when appropriate, by means of pipes.

The vehicle has heads, which are assemblies intended to support and allow the controlled movement of fins. In the case of the vehicle (1) illustrated, there are three heads (3, 4, 5). The set of fins (6) serves to support and temporarily fasten to the inner walls of the pipeline the casing (2) or the through-bar (8), depending on the part where the respective head is fastened. On each head (3, 4, 5) there are evenly spaced fins (6); in the case in point, three fins (6) are shown, offset circumferentially by 120°. Obviously, the invention encompasses other arrangements and other angles. The front (4) and rear (5) heads are connected securely to the front and rear parts, respectively, of the through-bar (8). The intermediate head (3) is mounted securely on the body or casing (2) of the vehicle (1). The fins (6) are for example connected to the respective heads by means of bearings (7). Said fins (6) of the intermediate head (3) may have rollers (11) in those regions which are in contact with the inner surface of the pipeline. These rollers (11) are aimed at reducing friction on the fins (6) of the intermediate head (3) when the vehicle (1) has to be removed from the pipeline. The body (2) has a rear cover (9) with a format and with means suitable for connection of an umbilical (10).

Figure 2:
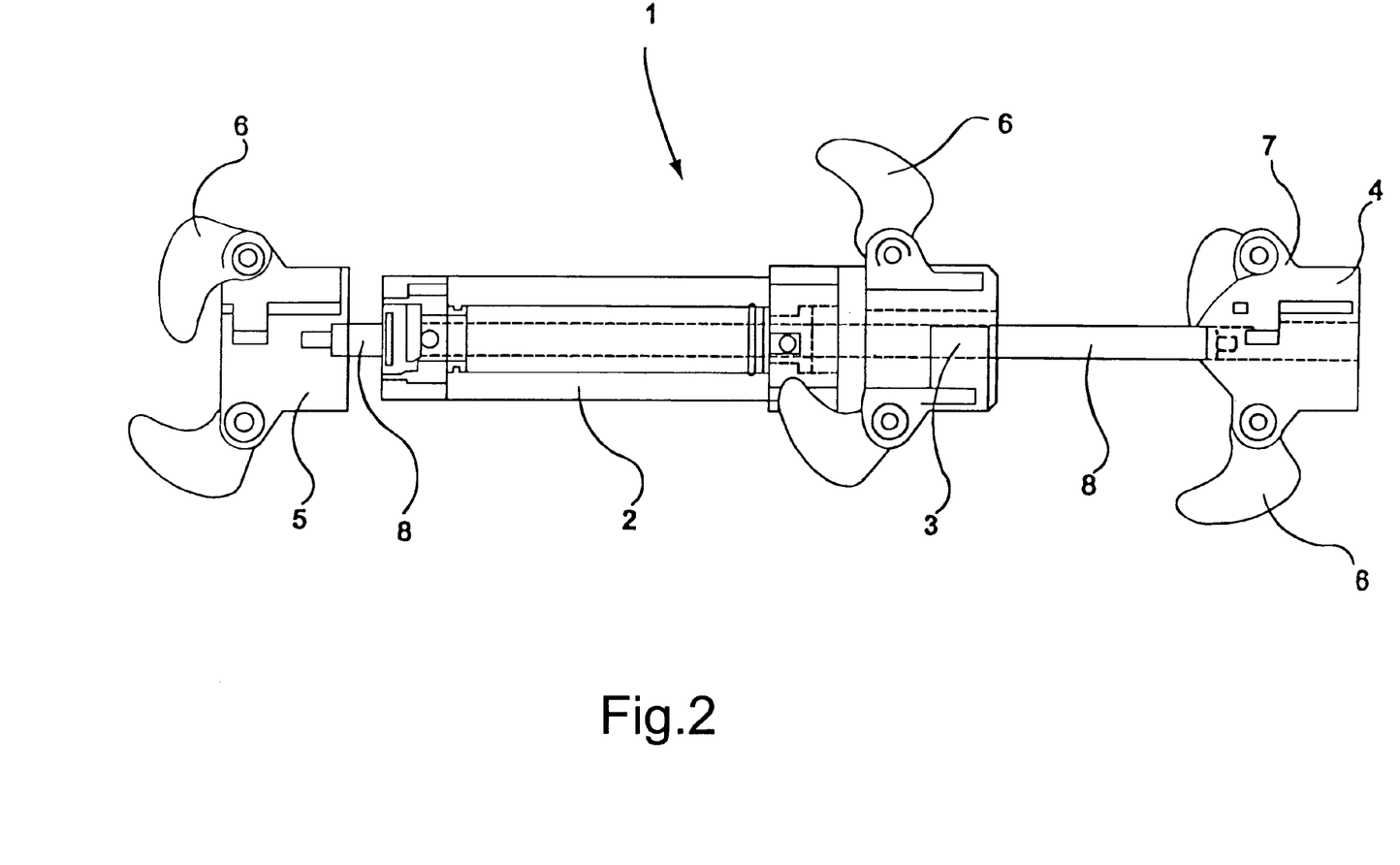
FIG. 2 shows a simplified diagrammatic sideview of the invention, showing the relative positions of the principal assemblies and respective interconnections.

In a diagrammatic longitudinal section, FIG. 2 shows the relative positions and interconnections of the principal assemblies which make up the invention. It will be seen that the through-bar (8) is connected rigidly to the front part of the rear head (5) and to the rear part of the front head (4). The intermediate head (3) is connected rigidly to the body (2) of the vehicle (1). The through-bar (8) passes right through the body (2) of the vehicle (1). It should be observed that the through-bar (8) does not pass through the front (4) and rear (5) heads, the connections being made only at one of the ends of each head (4 or 5).

FIG. 3 shows structural aspects of a front head (4) or rear head (5). These heads are practically identical. The intermediate head (3) differs from these in that it has a greater internal diameter, being completely hollow as it is fitted like a ring over the casing (2) of the vehicle (1). For this reason, unlike the front and rear heads (4, 5) which are connected to the through-bar (8), this intermediate head (3) is not provided with a collapser (13), as will be seen below.

Figure 3A:
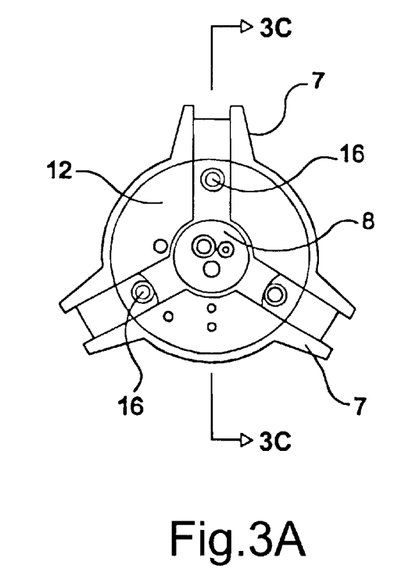
FIG. 3A shows a top view and FIG. 3B a side view of the head.

FIG. 3A shows a simplified end view of a front head (4) or rear head (5). In the central part of the Figure it is possible to see a transverse section of the through-bar (8), where there are longitudinal orifices for the passage of fluid when the invention is embodied in its hydraulic version. It is possible to see the bearings (7), which support the fins (6), mounted on the outer surface of the head and also offset. On the same radial lines which pass through the bearings (7), but further towards the inside of the blocks (12) of the head, it is possible to see the projections of the plugs (16) of the fluid cylinders (14) which actuate the fins (6).

Figure 3B:
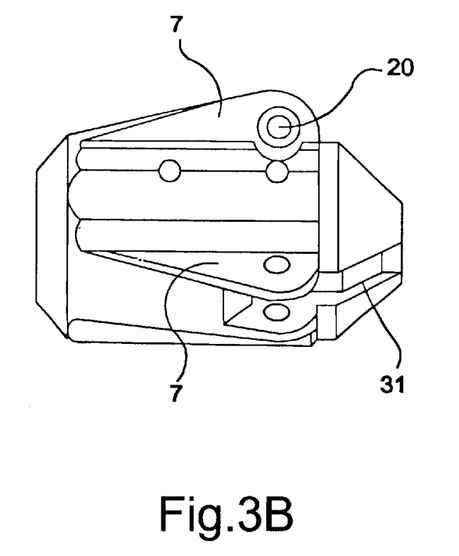

FIG. 3B shows a simplified side view of the same embodiment of a head. It is possible to see bearings (7) whose format is predominantly triangular, these having in the widest part an eyelet (20) where the respective fin (6) will be mounted by means of a pin (26) (not shown in the Figure). It is also possible to see, in the rear part of the head which has a predominantly frustoconical format following on from the bearing (7), which appears in the lower part of the Figure, a housing (31), in the form of a notch where the fin (6) will be positioned when not actuated.

Figure 3C:
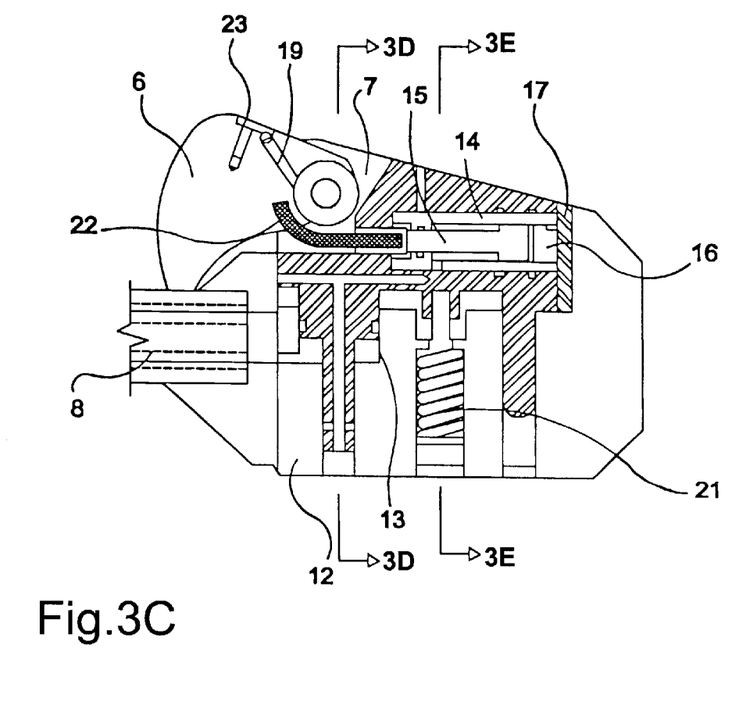
FIG. 3C shows the longitudinal section 3C—3C, showing aspects of the mounting of a fin on a movable table also called a "collapser".

FIG. 3C shows a partial, simplified longitudinal section of the same head, of either front or rear type, showing the principal internal components. This head has a set of fins (6) but only one is mounted on a collapser (13), as shown in FIG. 3C.

As already mentioned, in the case of the embodiment of the invention being described, none of the fins (6) of the intermediate head (3) is mounted by means of the use of a collapser (13). This is because this head (3) is mounted on the casing (2) of the vehicle (1) and, having an annular format, has insufficient space for the mounting of the collapser (13).

Figure 3D:
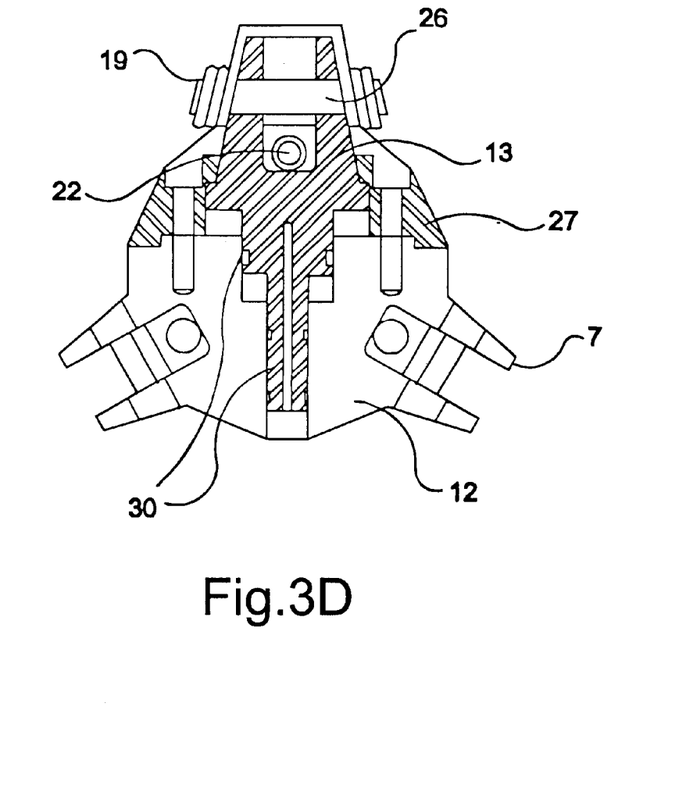
FIG. 3D shows the transverse section 3D—3D, passing through a front leg of the collapser

By means of the collapser (13) the fin (6) is able to carry out a movement, radially inwardly or radially outwardly of the block (12) of the head, as may be better seen in FIG. 3D. Thus, in addition to its rotational opening movement in order to rest on the inner wall of the pipeline, the fin (6) can, when necessary, be retracted inside the block (12) of the head. The fin (6) is actuated in two stages. In the first stage, the collapser (13) is pressurized and moves radially outwards and continues, during movement, to rest on the actual block (12) of the head, on the fitting (27), and on the bearing (17) of the collapser (13). In the second stage, after the collapser (13) has reached the "operational position", the fin (6) is actuated by means of the pressurization of its respective actuator cylinder (14) and it carries out a rotational movement about its shaft (26) until it bears on the wall of the pipeline.

The purpose of the collapser (13) is to prevent the fin (6) being caught on the wall of the pipeline in the event of incrustations or irregularities on the inner surface of the pipeline and possible failure of the other release devices (fin-retraction spring (19) and dual-action cylinder (14) for actuating the fin (6)) or of the general power-supply system.

In order to facilitate the sliding and sealing of the collapser (13), the block (12) of the head has a bearing (17) in the region of contact with the rear part of the collapser (13). In this case, this is a planar part mounted vertically on the block (12) of the head. The collapser (13) is kept in position, either during movement or when stationary, by means of a fitting (27) which provides it with support and a surface area suited to its movement within limits. In order to maintain its pressurization sealing means are provided where necessary.

Figure 4A:
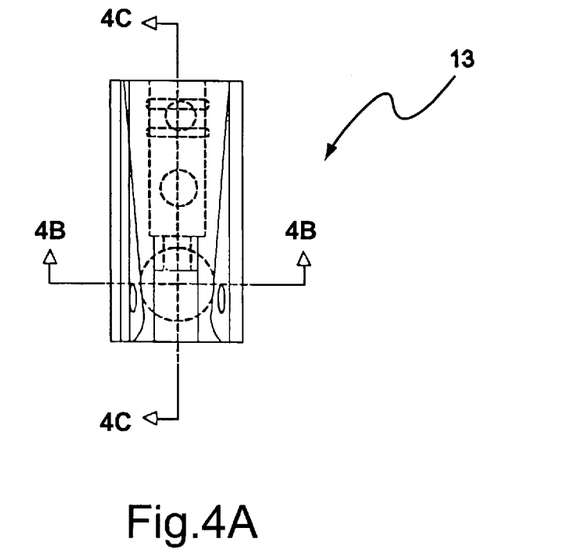
Figure 4B:
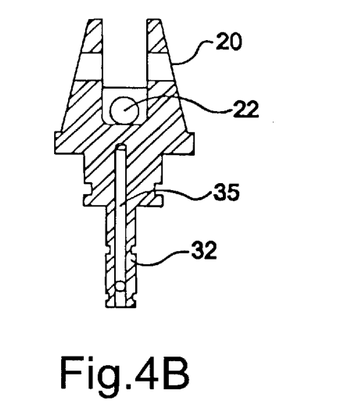
Figure 4C:
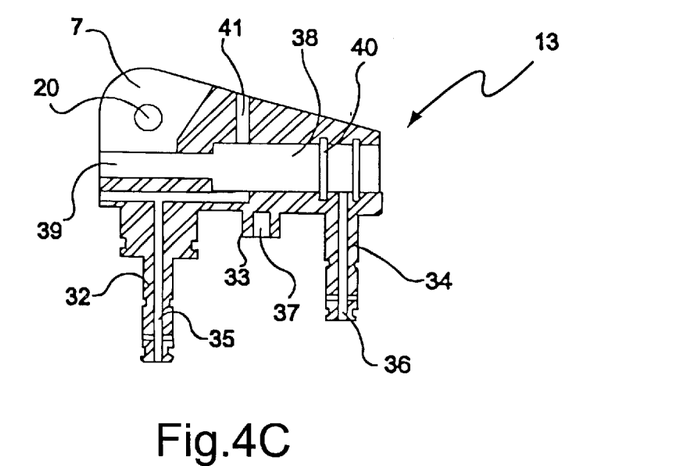

One embodiment of the collapser (13) is shown in FIG. 4. FIG. 4A is an upper view of this part (13). In the transverse section shown in FIG. 4B, it is possible to see that its upper portion is approximately in the form of a "U", forming a kind of housing (bearing) for the fitting of the fin (6) In the longitudinal section shown in FIG. 4C the collapser (13) has the general format of an inverted "U". The upper portion, of predominantly triangular format, forms the bearing (7) of the fin (6), which has, in its widest portion, an eyelet (20) where the rotary shaft (26) of the fin (6) is mounted. In the intermediate portion it is possible to see, extending parallel to the base of the bearing (7), the housing (38) of the actuator cylinder (14) and the housing (39) of the connector (25) of the actuating cable (22) of the fin (6). The lower portion is formed by three legs. The two outer legs (32, 34) have longitudinal inner orifices (35, 36) for circulation of hydraulic fluid. The shorter, intermediate leg (33) has a housing (37) for a pin or screw (29), which interconnects the collapser (13) and a helical spring (21) whose other end is connected to the block (12) of the head.

Returning to FIG. 3C, it is possible to see a fin (6) in the rear upper part (on the left) of the head. This part (6), which has the general format of a triangle with curved sides when seen side-on, is able to rotate about an eccentric horizontal shaft (26) mounted in an eyelet (20) in its respective bearing (7).

In the front head (4) and rear head (5), one of the bearings (7) incorporates the collapser (13) and the other two are secured to the block (12).

The fin (6) is actuated by means of a dual-action hydraulic cylinder (14). In the rear part of this actuator cylinder (14) there is a closure plug (16) and, as may be better seen in FIG. 7A, in the front part of its piston (15), there is a connector (25), where one end of a flexible interconnection cable (22) is caught, via which the fin (6) is moved about its shaft (26). Connected between the eyelet (20) and the fin (6) is a spring (19), for retracting the fin (6), which will be actuated by the actual opening of the fin (6). Access to this spring (19), part of which is positioned inside the fin (6), is achieved via a cavity (55), with a cover (24), which in turn is provided with a fastening means (23). This detail may be better seen in FIG. 8A.

Provision has been made both in the block (12) of the head and in the collapser (13), where necessary, for housings for sealing means and for chambers and orifices for circulation of hydraulic fluid.

FIG. 3D shows a transverse section of the head, passing through the shaft (26) of the fin (6). The lower portion of the Figure shows the block (12) of the head where two bearings (7) are rigidly mounted. The collapser (13) is mounted in the upper, central part of the block (12) and has a certain freedom of movement in the direction of emerging from or entering the block (12) radially, depending on whether or not it is pressurized. Thus the fin (6), mounted on the collapser (13), may be moved in the direction in which it approaches the inner wall of the pipeline or moves away from this same wall. The collapser (13) is held correctly positioned in the block (12) by means of the so-called fitting (27) of the collapser (13), which has means for its connection to the block (12).

Figure 5A:
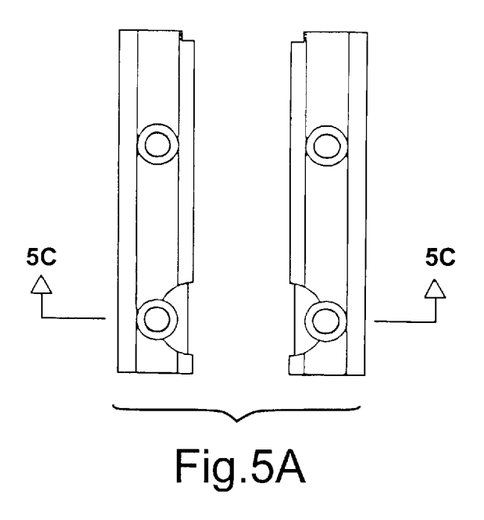
FIG. 5A shows an upper view.
Figure 5B:
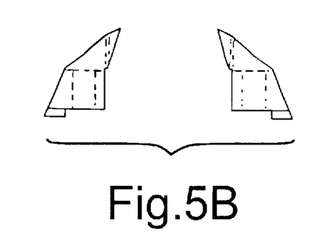
FIG. 5B shows an end view and FIG. 5C shows the transverse section 5C—5C of the fitting of the collapser.
Figure 5C:
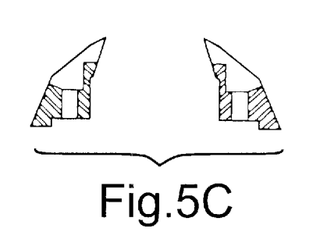

The fitting (27) of the collapser (13) may be seen in greater detail in FIG. 5. FIG. 5A shows an upper view of this part, FIG. 5B shows an end view, and FIG. 5C shows a transverse section. Basically, there are two elongate parts with means for connection to the block (12) and with a format such that it allows the controlled movement of the collapser (13), preventing it from being released from the block (12). The two parts of the fitting (27), mounted one on either side of the collapser (13), longitudinally delimit a surface for the movement thereof.

Figure 3E:
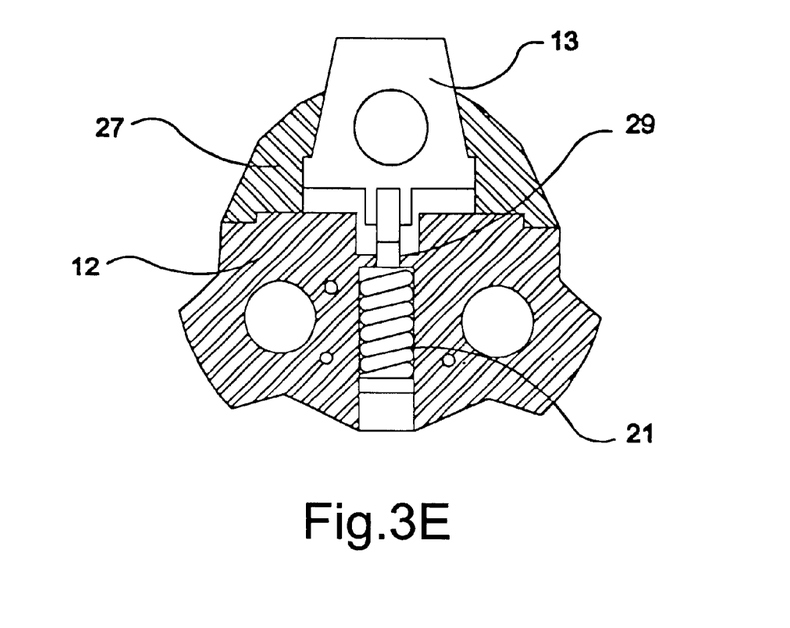
FIG. 3E shows the transverse section 3E—3E, passing through the retraction spring of the "collapser".

In the same manner as FIG. 3D, FIG. 3E shows a transverse section of the head, but now one passing through the helical spring (21) connected between the block (12) of the head and the collapser (13). The purpose of this spring (21) is to retract the collapser (13) inside the block (12). The collapser (13) enters into an operational position by means of pressurization and in this situation the spring (21), held between the block (12) and the collapser (13), is distended. Thus, if the collapser (13) is depressurized, the helical spring (21) will tend to return to its rest position, retracting the collapser (13) inside the block (12) of the head.

Figure 6:
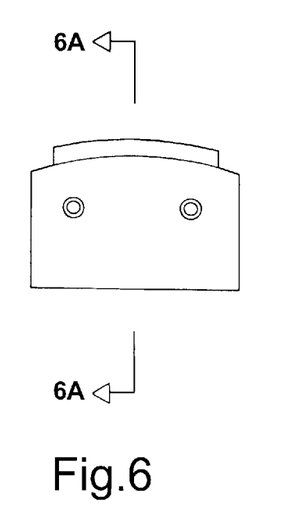
FIG. 6 shows a front view of an embodiment of a bearing of a collapser.
Figure 6A:
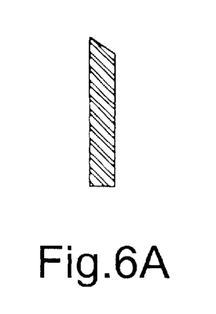
FIG. 6A is a view taken along line 6A—6A of FIG. 6.

In an elevational view and in cross section, FIG. 6 shows an embodiment of the bearing (17) of the collapser (13). This part forms the interface between the rear surface of the collapser (13) and that of the block (12) of the head and, to supplement the fitting (27), provides a surface which is suited to the sliding of the collapser (13). In the case in point, this is a flattened part of predominantly rectangular format; however, if desired the upper surface may be convex. It has means for fastening it to the block (12) of the head.

FIG. 7 shows an embodiment of the actuator of the fin (6). This is a dual-action hydraulic cylinder (14). FIG. 7A shows a longitudinal section of the cylinder (14) with its internal devices mounted. FIGS. 7B and 7C show longitudinal and end views of the piston (15) of the cylinder (14). FIGS. 7D and 7E show a longitudinal section and an end view of the connector (25) of the cable (22) for actuating the fin (6).

Figure 7A:
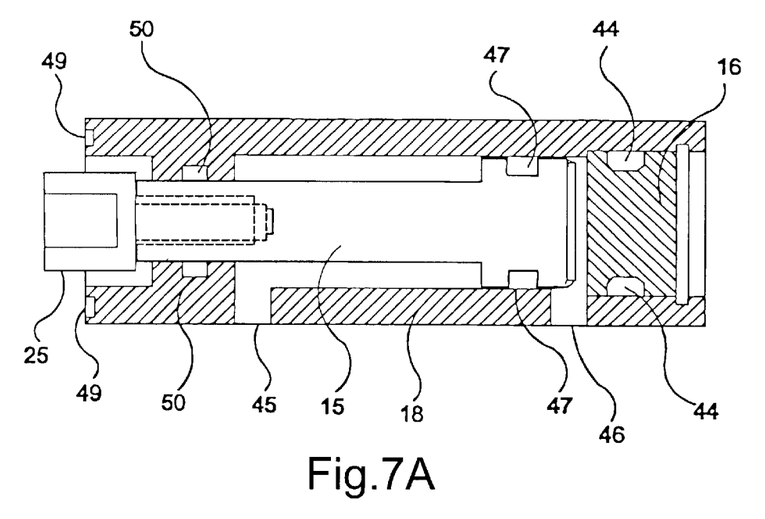
FIG. 7A shows a cross section of the cylinder with the principal internal components fitted.

One of the ends of the cylinder (14) is provided with a closure plug (16) which has a groove (44) for the installation of a sealing ring. The casing (18) of the cylinder (14) has, in its central part, a chamber where the piston (15) is housed, provided with the necessary orifices (45, 46) for entry or exit of fluid. The connector (25) of the cable (22) for actuating the fin (6) is housed at the other end, connected to the piston (15). At one of the ends, the piston (15) has a head (51) which has a greater diameter than the rest of its body and is provided with a groove (47) for the installation of a sealing ring. At the other end, the piston has means (an orifice (53) along the longitudinal axis) for the connection of a flexible actuating cable (22).

Figures 7B, 7C:
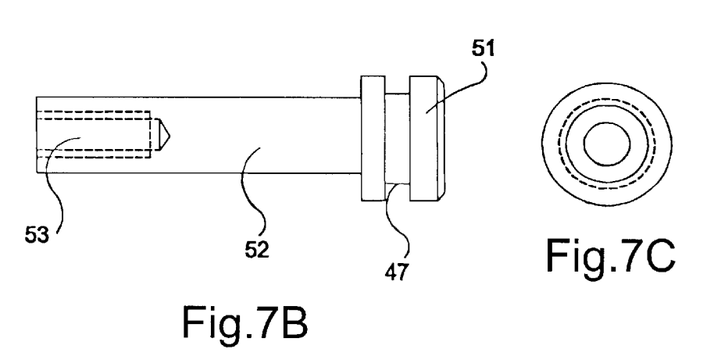
FIGS. 7B and 7C show views of the piston of the cylinder.
Figure 7D:
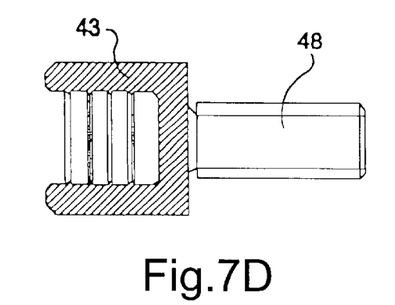
FIGS. 7D and 7E show views of the connector of the cable for interconnection of the piston with the fin.
Figure 7E:
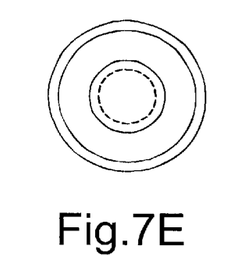

By means of a longitudinal section and of a front view, FIG. 7C shows the connector (25) of the cable (22) for actuating the fin (6). This part is formed firstly by a kind of socket (43) equipped with means for holding the cable (22), and secondly by a kind of cylinder (48) equipped with means for its interconnection to the piston (15) of the actuator cylinder (14) of the fin (6).

FIG. 8 shows diagrammatic views of one embodiment of a fin (6), of its rotary shaft (26), and of its retraction spring (19). FIGS. 8A and 8B show a side view of a fin (6). Its shape, seen side-on, is predominantly that of a triangle with curved sides. The format selected must provide a facility for the fastening of the fin (6) to the wall of the pipeline, when pressurized, and prevent the vehicle (1) being dragged backwards by the umbilical when not pressurized. In the region of one of the vertices, there is an eyelet (54) for the connection of the fin to the respective bearing (7), for example by means of a shaft (26). The fin (6) has a cavity (55) provided with a cover (24), for access to the respective retraction spring (19). The shaft (26), shown in FIG. 8E, has its ends equipped with an inclined flange (57) and has means for fastening it to the eyelet (20).

Figure 8A:
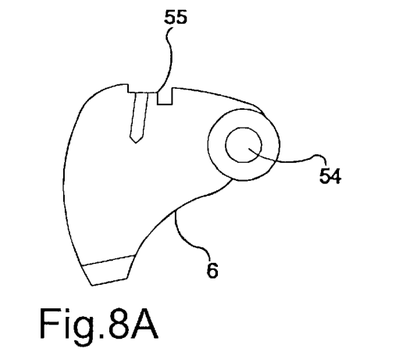
FIGS. 8A–8D show a side view of the fin and details of the access opening to its retraction spring.
Figure 8B:
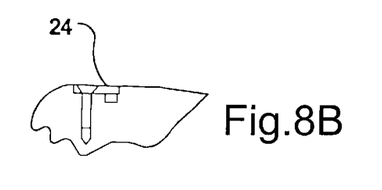
Figure 8C:
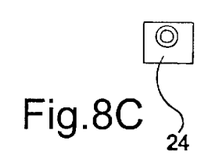
Figure 8D:
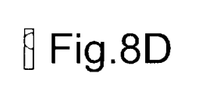
Figure 8E:
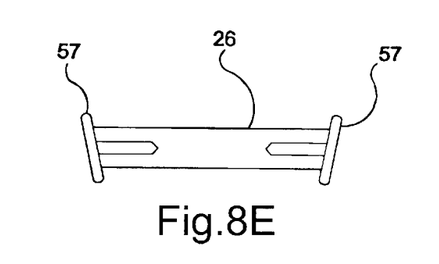
FIG. 8E is a view of the shaft of the fin.
Figure 8F:
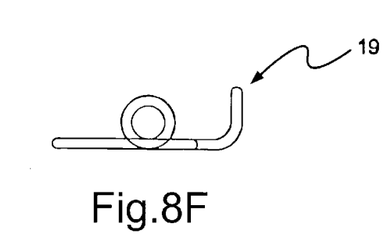
FIGS. 8F–8H show views of the retraction spring of the fin.
Figure 8G:
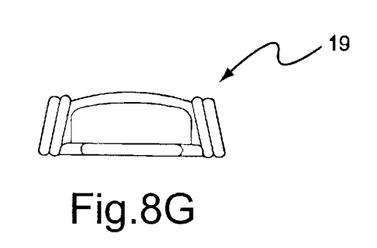
Figure 8H:
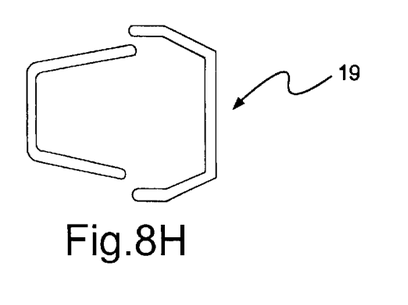

FIGS. 8F–8H show views of the spring (19) for retracting the fin (6). This spring (19) works coupled to the shaft (26) of the fin (6) and to the actual fin (6), tending to restrict the movement of the fin, i.e. to provide its retraction when there is no pressurization in its actuator cylinder (14).

In the embodiment described, the vehicle (1) is actuated hydraulically. Although not shown in detail in the Figures, there is a hydraulic system 10 for powering the various functions of the vehicle (1). This system comprises at least one external source of fluid, an umbilical (10) and, in the vehicle (1), orifices, chambers, pipes, seals, special connections, hydraulic cylinders and command and control valves. It also comprises at least the following flow circuits:

i) for the substance which will be used for unblocking the pipeline, such as, for example, a solvent or SGN (Nitrogen-Generating System);

ii) for hydraulic fluid for advancing the through-bar (8) and for actuating the fins (6) of the head (3) of the casing (2) of the vehicle (1), by means of the respective actuator cylinders (14);

iii) for hydraulic fluid for advancing the body (2) of the vehicle (1) and for actuating the fins (6) of the front (4) and rear (5) heads, by means of the respective actuator cylinders (14);

iv) for return of the fluid from the actuator cylinders (14) of the fins (6); and v) for hydraulic fluid for positioning the collapsers (13).

The operation of the vehicle (1) may be manual, semi-automatic or automatic, depending on the degree of automation applied to the system and deemed appropriate to the intervention/operation scenario. Therefore, the necessary control elements should be selected.

The operation of the vehicle (1) may be manual, semi-automatic or automatic, depending on the degree of automation applied to the system and deemed appropriate to the intervention/operation scenario. Therefore, the necessary control elements should be selected.

Although hydraulically actuated equipment has been described, by means of adaptation in the actuators and where most necessary, the invention may use another type of energy, for example electrical energy, or also an energy combination.

In order to use the invention, the vehicle (1) should initially be inserted completely inside the pipeline via an access end thereof. To do this, all the fins (6) of the equipment (1) are retracted. Next, hydraulic fluid is injected into the rear chamber of the body (2) of the vehicle (1). As already mentioned, the through-bar (8) has orifices for circulation of fluid. Thus, before the fluid is able to pressurize the said rear chamber, and consequently to tend to move the through-bar (8) forwards, it passes via one of the said longitudinal holes of the bar (8) and initially pressurizes the chambers of the collapsers (13) in the front (4) and rear (5) heads, placing them in an operational position. Simultaneously, the fluid pressurizes the actuator cylinders (14) of the fins (6) of the head (3) connected to the casing (2) of the vehicle (1), opening them and fastening the vehicle (1) to the pipeline by means of the casing (2). After the fluid has reached the end of travel of the actuator cylinders (14) of the fins (6), it will tend to pressurize the rear chamber of the body (2) of the vehicle (1), giving rise to a relative movement between the body (2), fastened to the pipeline, and the through-bar (8) which begins to move forwards. When the through-bar (8) reaches the end of its travel, an increase in pressure will be detected in the line which is supplying the respective hydraulic circuit. At this time, the flow of fluid is reversed and fluid is now injected into a second chamber immediately in front of the said rear chamber of the vehicle (1). The fluid enters this second chamber and, after filling it, flows inside the through-bar (8), backwards and forwards. Going backwards and forwards, irrespective of the sequence, it pressurizes the cylinders (14) of the fins (6) of the heads (4, 5) connected to the through-bar (8). Simultaneously the fins (6) of the head (3) of the casing (2) no longer receive hydraulic pressure, but remain in contact with the walls of the pipeline. A kind of "wedge" effect, resulting from the shape of the fins (6), prevents the casing (2) moving backwards through the pulling effect of the umbilical (10). When the cylinders (14) of the fins (6) of the heads (4, 5) of the through-bar (8) are full, the fluid pressurizes the said second chamber and, as the through-bar (8) is caught, the casing (2) will move forwards taking the umbilical (10) with it. At the end of this stage, the actuating system will have returned to its initial state, but the vehicle will have completed one unit of movement. From here onwards, the cycles are repeated.

The speed of movement of the vehicle (1) depends on the design conditions of the equipment.

The vehicle (1) has safety devices to ensure that it does not become caught in the pipeline in the event of some defect in the actuating system or because the fins become caught on some material which is partially obstructing the pipeline. Such devices are based on:

the action of springs;

hydraulically actuated fin-support structures which are provided in order to "collapse", i.e. retract when hydraulic pressure is relaxed;

the actuation of the fins by dual-action hydraulic cylinders capable of positively retracting the fins when required.

A first level of safety is provided by means of a spring (19) for retracting the fin (6). Thus, if the umbilical (10) breaks the cylinders (14) for actuating the fins (6) will not be actuated and the fins will be drawn in through the effect of the said spring (19).

A second level of safety is provided in the front (4) and rear (5) heads by means of the "collapser" (13). This device makes one of the fins (6) of each head "collapse", i.e. it is retracted towards the inside of the head. The three fins (6), when in an operational position, define a circle supporting the head on the inner wall of the pipeline. If one of the fins (6) retracts, another circle with a diameter which is smaller than that of the cross section of the pipeline will be defined for the new position of the assembly, releasing the respective heads and consequently releasing the vehicle (1). In this way, if the umbilical (10) breaks, the collapser (13) will tend to retract owing to the action of the helical spring (21) which fastens it to the block (12) and which, through the action of hydraulic pressure, was distended.

A third level of safety arises from the fact that the cylinders (14) which actuate the fins (6) are dual-action cylinders. Thus, when the fin (6) has been actuated and its retraction is required, in the event of it not returning through the action of the respective spring (19) there is the possibility of its being returned by hydraulic means, i.e. by means of the injection of fluid into the corresponding front chamber of its actuator cylinder (14).

Finally, an additional facility is provided in the intermediate head (3). Owing to the greater diameter of the casing (2), and because this head (3) does not have a collapser (13), its fins (6) are not in line with those of the heads (4, 5) of the through-bar (8), but projecting slightly more. Thus, in order to facilitate the withdrawal of the vehicle (1), the fins (6) of the intermediate head (3) have rollers (11), shown in FIG. 1, in the region of contact with the inner wall of the pipeline.

Using the above-mentioned means, it is possible in practice to guarantee that the fins (6) will be retracted at the time it is required to withdraw the vehicle (1) from inside the pipeline, in the event of an abnormal situation.

Although not shown in detail in the drawings, the fluid reaches the rear plate of the casing (2) of the vehicle (1) via a line of the umbilical (10). From this point, the fluid is distributed to the various heads and chambers in an established sequence. Some distribution lines go via the inside or walls of the casing (2), others via the inside of the through-bar (8), and others are formed by independent pipes.

The application of the invention in confined spaces other than pipelines may require minor adaptations, such as for example in the shape, the number or the arrangement of the fins (6).

What is claimed is:

1. Remote-controlled vehicle for operations inside pipelines, to facilitate the movement of equipment and materials inside pipelines or other confined spaces, comprising:

a predominantly tubular body surrounding a through-bar;

a plurality of heads having movable fins mounted thereto, said body being connected to at least a first one of said heads and said through-bar being connected to at least a second one of said heads;

said body forming a hydraulic cylinder;

said through-bar having orifices for circulation of fluid;

each said head having an actuator for extending and retracting said fins;

and said through-bar being configured for moving longitudinally through said body.

2. Remote-controlled vehicle according to claim 1, wherein the shape of the fins and the arrangement of the fins of each head promote fastening of the head on an inner surface of the pipeline when the fins are actuated and, when not actuated, allow movement of the vehicle forwards and prevent movement of the vehicle backwards; wherein said fin is mounted to allow planar rotary movement, with respect to an eccentric shaft, actuated by said actuator which includes a dual-action actuator having a retraction spring and being connected to the said actuator by a flexible member; and wherein said eccentric shaft connects said fin to a respective one of said heads.

3. Remote-controlled vehicle according to claim 1, wherein said second head has a said fin mounted on a collapser with freedom of movement radially inwardly and radially outwardly of the head; said collapser comprising means enabling it to interface with and to connect to a block of the head, said actuator for the fins including chambers and orifices for circulation of fluid; wherein said collapser is interconnected to the block of the head by an elastic member.

4. Remote-controlled vehicle according to claim 1, wherein, the vehicle is capable of operating with hydraulic control and actuating systems that are capable of both manual and automatic operations.

5. Remote-controlled vehicle according to claim 1, wherein the vehicle is capable of operating with a remotely controlled manipulator.

6. Remote-controlled vehicle according to claim 1, wherein the vehicle is capable of carrying tools, equipment or materials to a remote point inside the pipeline.

* * * * *